March 19, 1929.  H. KNOPF  1,706,029
STAND FOR HAMMOCKS AND THE LIKE
Filed May 8, 1928
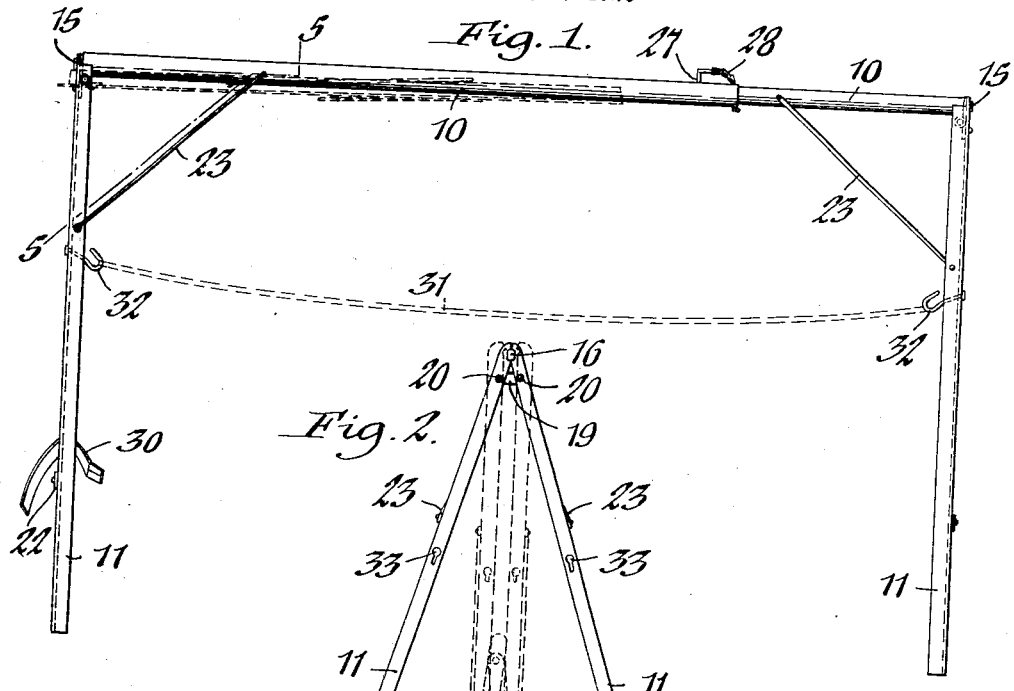
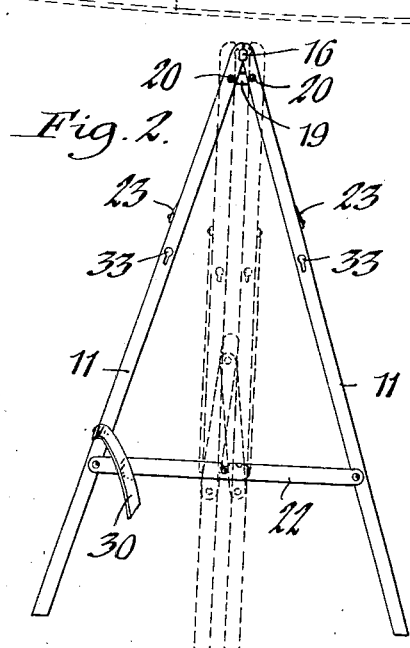
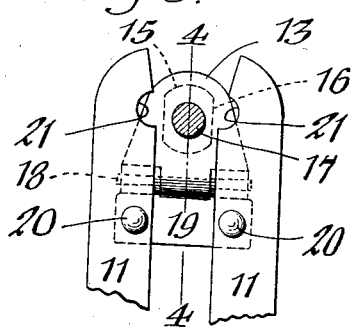
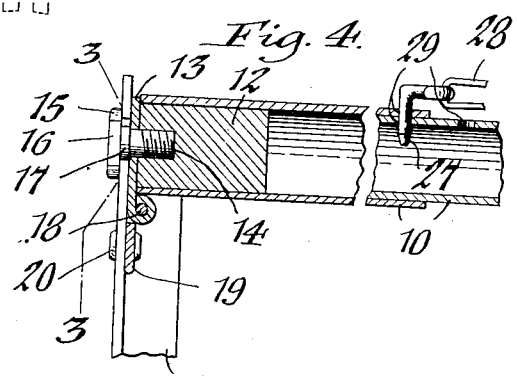
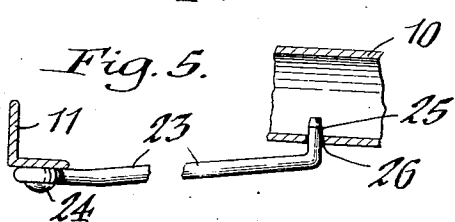
Inventor,
Henry Knopf,
by Geyer & Geyer
Attorneys.

Patented Mar. 19, 1929.

1,706,029

UNITED STATES PATENT OFFICE.

HENRY KNOPF, OF NORTH TONAWANDA, NEW YORK.

STAND FOR HAMMOCKS AND THE LIKE.

Application filed May 8, 1928. Serial No. 276,067.

This invention relates to improvements in stands or supports for hammocks and the like.

One of its objects is the provision of a simple and inexpensive stand of this character which is so constructed and arranged that it can be compactly folded when not in use and requires but a minimum of storage space, rendering it particularly useful for automobile tourists.

Another object of the invention is to provide a strong and rugged hammock stand which does not require the use of separate fasteners or tools for assembling and dismembering it and whose parts are joined to form a unitary self-contained structure.

In the accompanying drawings:—

Figure 1 is a side elevation of a hammock stand embodying my invention. Figure 2 is an end view thereof. Figure 3 is an enlarged cross section on line 3—3, Figure 4. Figure 4 is a longitudinal section on line 4—4, Figure 3. Figure 5 is an enlarged fragmentary longitudinal section on line 5—5, Figure 1.

Similar characters of reference indicate corresponding parts throughout the several views.

My improved stand or support comprises a horizontal bar composed of telescopically-joined tubular sections 10, 10 and a pair of foldable legs 11, 11 depending from the ends of the bar and so mounted thereon as to be foldable laterally toward each other and also longitudinally toward or against said bar in the manner shown by dotted lines in Figures 2 and 1, respectively.

Fitted in the outer ends of the tubular bar-sections 10 are wooden plugs 12 to each of which is applied a pendant foldable hanger or leg carrier consisting of a hinge leaf or plate 13 secured to its plug by a bolt 14, the outer end of the latter terminating in a head 15 spaced from the hinge leaf and having flat sides 16, the projecting portion of the bolt adjacent its head forming a collar or bearing portion 17 whose resulting shoulder abuts firmly against the face of the hinge plate, as shown in Figure 3. Joined to the hinge plate 13 by a transverse pintle 18 is a companion hinge leaf or plate 19 to the opposite ends of which the corresponding pair of legs 11 are connected, as by pivot pins 20 disposed at right angles to the hinge pintle. The opposing inner edges of the legs above their pivots are provided with substantially semi-circular recesses 21 which are of the same diameter as the bolt-collar 17 and which are adapted to embrace the same in the unfolded position of the legs, shown by full lines in Figure 2. In this position, those portions of the legs containing these recesses are firmly clamped against longitudinally displacement between the head of the bolt 14 and the opposing face of the hinge plate 13. The purpose of flattening the opposite sides of the bolt-head, as shown, is to allow the upper opposing edges of the legs to clear said head when they are brought to a substantially parallel position preparatory to folding them toward the bar 10.

Each pair of legs 11 is held firmly in its unfolded or laterally distended position by a foldable brace 22 and in a substantially upright position relative to the horizontal bar 10 by links 23, each pivoted at one end, as indicated at 24, to the companion leg and terminating at its other end in a hook 25 arranged to engage an opening 26 in the bar, as shown in Figure 5. For the purpose of enabling the legs to be folded snugly against the bar, the links 23 of one pair of legs are pivoted thereto on their outer sides while those of the other pair of legs are pivoted to the inner sides of the latter as seen in Figure 1.

A suitable locking pin 27 attached to a chain 28 anchored to one of the bar-sections 10 and arranged to engage alining openings 29 in such sections may be employed for reliably holding them in a predetermined set position and at any desired length.

Riveted or otherwise fastened to one of the legs 11 is a strap 30 which is preferably provided for conveniently tying both pairs of legs in their folded position against the bar.

Any suitable means may be employed for suspending the hammock 31 from the stand, that shown in the drawings, by way of example, consisting of hooks 32 detachably mounted in key-hole slots 33 in the legs 11.

In setting up or unfolding the improved stand for use, the strap 30 is unbuckled, the legs are swung to a substantially upright position and unfolded to bring their notched upper ends into interlocking engagement with the collar of the bolt 14, after which the links 23 are brought into engagement with their locking openings 26 in the bar 10. The hooks 32 are then set in place and the hammock suspended therefrom in an obvious manner. In knocking down the stand, the hammock and its suspension hooks are first removed, after which the legs 11 are folded together, the links 23 uncoupled and thereupon the legs are folded against the bar 10 and strapped thereto.

I claim as my invention:—

1. A stand of the character described, comprising a horizontal bar, pendant foldable hangers applied to the ends of said bar for movement toward and from the same, means for fastening the hangers to the bar, and foldable legs pivotally mounted on said hangers below the fulcrums thereof, the upper ends of said legs being arranged to interlock with said fastening means in their unfolded position.

2. A stand of the character described, comprising a horizontal bar, pendant foldable hangers applied to the ends of said bar for movement toward and from the same, headed-fasteners for connecting said hangers to the bar, the heads of the fasteners being spaced from the opposing faces of the corresponding hangers, and laterally foldable legs pivotally mounted on said hangers below the fulcrums thereof, the upper ends of said legs being arranged to interlock with said fasteners in the resulting spaces between the heads thereof and the hangers to hold the latter against folding in the unfolded position of the legs.

3. A stand of the character described, comprising a horizontal bar, headed-pins projecting from the ends of said bar, hangers fulcrumed at the ends of the bar for movement against the underside thereof, and foldable legs pivotally mounted on said hangers, the upper ends of said legs, when unfolded, being arranged to engage the corresponding pins at a point between their heads and the opposing ends of said bar.

4. A stand of the character described, comprising a horizontal bar, headed-pins projecting from the ends of said bar, hangers fulcrumed at the ends of the bar for movement against the underside thereof, foldable legs pivotally mounted on said hangers, the upper ends of said legs, when folded, being arranged to engage the corresponding pins at a point between their heads and the opposing ends of said bar, and brace members pivotally mounted at one end on said legs and detachably engageable at their opposite ends with said bar.

5. A stand of the character described, comprising a horizontal bar having leg-engaging elements at its ends, vertically-swinging hinge members applied to the ends of said bar, and two pairs of foldable legs, the legs of each pair being fulcrumed on the corresponding hinge members to swing laterally thereon and also with the hinge members toward and from the underside of said bar, the upper ends of said legs being recessed to interlock with said leg-engaging elements in their unfolded operative position.

6. A stand of the character described, comprising a horizontal bar, hinge members applied to the ends of said bar, headed fasteners for securing one of the leafs of each hinge member to the bar, the companion leaf being foldable toward and from the underside of the bar, and two pairs of foldable legs, the legs of each pair being fulcrumed for laterally-swinging movement on the corresponding movable hinge member and being provided in their upper opposing edges with recesses arranged to embrace the respective fasteners between their heads and the opposing sides of the companion fixed hinge member.

HENRY KNOPF.